Patented Dec. 4, 1951

2,577,369

UNITED STATES PATENT OFFICE 2,577,369

CERAMIC INSULATOR FOR SPARK PLUGS

Harry G. Schurecht, Detroit, Mich., assignor to Champion Spark Plug Company, Toledo, Ohio, a corporation of Delaware No Drawing. Application July 19, 1947, Serial No. 762,203

6 Claims. (Cl. 106—46)

This invention relates to improvements in ceramic insulators for spark plugs and for similar uses. As the demands upon internal combustion engines are stepped up, the severity of the requirements for spark plug insulators is likewise increased. The particulars in which the requirements have been increased recently to the most marked extent is the requirement for high thermal conductivity and for high insulating qualities at increased temperatures. In many cases there is also an increased demand for insulators which are resistant to corrosion by lead compounds contained in the fuel, and other corrosive effects of the gases customarily present in internal combustion engines.

Insulators high in beryllium oxide have a very desirable high heat conductivity and are generally resistant to heat shock, and the beryllium oxide is resistant to corrosion by compounds containing lead and other ingredients in the gases normally encountered in an internal combustion engine. Pure beryllium oxide requires a higher sintering temperature than is customarily employed in the manufacture of insulators for spark plugs and similar purposes, but it has been found that the maturing temperature of a ceramic batch high in beryllium oxide can be lowered to a readily reached point by additions of properly selected and proportioned materials while retaining substantially intact the desired high heat conductivity and resistance to heat shock and to corrosion. For example, $B_2O_3$, $Tl_2O_3$, $Y_2O_3$ and many of the rare earths from group III of the periodic system may be added. The $B_2O_3$ and $Tl_2O_3$ have such a strong fluxing action that the amount which can be added while retaining the desired refractory quality is limited. Though the other members of this group may be added indefinitely without that difficulty, more than about 20% of any of these ingredients tends to decrease heat conductivity, and an amount equal to over ⅔ of the amount of BeO has a detrimental effect on the electrical properties. Therefore, not over 10% of $B_2O_3$ or $Tl_2O_3$, or of the other member of group III, over ⅔ of the amount of BeO, is generally desirable.

Oxides of elements of group IV from $SiO_2$ to $ThO_2$ may be added to some extent and reduce the firing temperature without detriment to heat conductivity or electrical resistance. However, $SiO_2$ and $TiO_2$ increase the susceptibility of the insulator to corrosion by lead compounds in the fuel. The four members of this group $ZrO_2$, $SnO_2$, $CeO_2$ and $ThO_2$ may be added in amounts up to ⅔ the amount of BeO in the insulator without severe detriment, and are preferable to $SiO_2$ or $TiO_2$ for their effect on hot dielectric value, though over 20% of any of these may decrease somewhat the heat conductivity.

Not only is substantially pure beryllia too refractory to fire readily in quantity production, but the material is usually prepared by grinding in ball mills or the like where there is an appreciable contamination with the material of the balls and mill lining. Where the balls and lining contain silica and alumina with alkali binding compounds, as is frequently the case, the contamination is sufficient to objectionably lower the electrical resistance at high temperatures, while still leaving the material unnecessarily and undesirably refractory. It has been discovered that the addition of a compound of calcium in an amount to add at least ½% of CaO to the composition effects a radical improvement in the hot dielectric value, and equivalent additions of compounds of Sr, or Ba have a similar effect. Therefore, by adding a compound of one of the three alkaline earths mentioned to the high BeO insulator, there is produced an insulator having the desired very high heat conductivity imparted by BeO and also having a hot dielectric value amply high for any demands yet made on spark plug insulators.

The specific hot dielectric values are affected by the preparation, the molding and by the firing of the material, as well as by the ingredients and their proportions, so that exact figures for the electrical resistance of a given composition will not apply if the method of preparing and manufacturing is changed, but to indicate to some degree the character of the change made by the addition of the various alkaline earths to insulators high in beryllium, the following data may be given as to tests made upon samples prepared as nearly as possible as duplicates with the exception of additions of compounds of the said alkaline earths. For example, a substantially pure beryllium oxide composition with 1½% bentonite to aid in molding was ground and made into a ½ inch cylinder and was found to have a resistance of 22 megohms at 1400° F. The same composition with 1½% calcium carbonate added thereto and tested in the same way was found to have a resistance of more than 100 megohms not only at 1400° F., but also 1500° F. An addition of 2.96% barium carbonate, or 1.78% strontium carbonate likewise stepped up the resistance at 1500° F. to above 100 megohms. Thus the three alkaline earths in equimolecular proportions had very similar effects.

While only a small amount of the oxide of calcium, strontium or barium is necessary in the sintered insulator to obtain the required high hot dielectric value, very considerable additions of the alkaline earth compounds may be made with the desirable effect of lowering the sintering temperature without serious detriment to other qualities. About 20% of the entire mixture may be alkaline earth to advantage. While increase beyond that point up to an amount equalling the BeO present may be made and still produce an insulator satisfactory for many purposes and usable as spark plug insulators, increase above the 20% proportion seems to decrease heat conductivity, and therefore is not recommended for best results. The proportion is calculated on the basis of the alkaline earth, that is, the oxide of calcium, strontium or barium, regardless of whether it is added as the oxide or as a compound, such as carbonate or hydrate, that forms the same end product when fired. For example, 31% of whiting fired, with 69% of oxides which remain after sintering will result, after the $CO_2$ is driven off, in a composition substantially 20% CaO.

Where considerable amounts of the alkaline earth compound is used, it should be noted that CaO is more resistant to corrosion by lead compounds than are SrO or BaO. Therefore the CaO compound is preferable to the other two when the insulator is to be subjected to lead compounds.

A similar marked improvement in the hot dielectric value is produced by the inclusion of the alkaline earth when considerable amounts of alumina are added to the composition. The quality of the insulator is affected adversely very little by the addition of alumina until upwards of 25% is introduced, where the balance is chiefly BeO, or upwards of ⅔ the amount of BeO where considerable amounts of alkaline earth or from the fourth group are present. It even adds somewhat to the mechanical strength of the insulator and changes very little the electrical quality and to only a small degree decreases the thermal conductivity. However, too great an amount of alumina not only markedly decreases the thermal conductivity, but also decreases the electrical resistance, especially where there are impurities, until a proportion is reached where the composition is mostly alumina. The poorest proportion of these two materials with respect to each other is in the range of from 30% to 40% beryllium oxide to 70 to 60% alumina. In this range, with impurities usually present in commercial practice, even the addition of an alkaline earth does not produce a satisfactory spark plug insulator, and any quantity of alumina materially above 25% of the composition is injurious to some of the qualities of the composition for spark plug insulator purposes.

A half inch cylinder sintered at cone 16 from a ground mixture of 75 parts BeO and 21.5 parts $Al_2O_3$ had a resistance at 1100° F. of 43 megohms, while the same mixture sintered at the same temperature and tested in the same way with the addition of 1.5 parts whiting, 1.78 parts $SrCO_3$ or 2.96 parts $BaCO_3$ had a resistance of over 100 megohms at 1100° F., the test going only that high, and there was reached with $SrCO_3$ a resistance of 95 megohms at 1400° F., and with a $CaCO_3$ and $BaCO_3$ over 100 megohms at 1400° F.

For purposes of firing it is desirable to add other fluxes. Boric acid and borates may be employed in small amounts for fluxing purposes without injury to the resultant qualities, and may even improve both the heat conductivity and hot dielectric value. Silica and heavier members of group IV of the periodic system have a noticeable fluxing action, and may be added as indicated above while retaining a high hot dielectric value, if the alkaline earth is present.

It has hitherto been assumed that the presence of alkali metal fluxes in insulators was injurious to the high hot dielectric value. It has been discovered that with the high beryllium oxide insulators with the addition of an alkaline earth compound and members of the fourth group of the periodic table in appropriate amounts, a considerable quantity, at least up to 5%, of any of the alkali metal oxides or equivalent compositions may be introduced without material injury to the hot dielectric value, provided there is little or no alumina present. If alumina is introduced, the addition of sodium or lithium compounds appears to be very injurious to the hot dielectric value. However, where the composition is predominantly beryllia and contains not over 25% alumina, compounds of potassium may be added, when desired, without a marked decrease in the hot dielectric value where the amount of such addition is under 5%. Talc or other compounds of MgO may be added in small amounts, but are not as effective as the previously named alkaline earths in mixtures described.

Other refractory oxides may be present as impurities or as intentional additions, but it is preferable that not over 5% of the entire mixture, as calculated from analysis of the sintered insulator, shall be of anything other than BeO, alkaline earth, or from the third and fourth groups of the periodic system. Preferably there are at least enough other materials mixed with the BeO to form a batch maturing at as low a temperature as that of cone 31.

The following compositions matured at cone 31, and ½ inch cylinders showed an electrical resistance of more than 100 megohms at 1400 F.

| BeO | $Al_2O_3$ | $CaCO_3$ | MgO | Bentonite | $SnO_2$ |
|-----|-----------|----------|-----|-----------|---------|
| 75  | 21.5      | 1.5      | .9  | 1.5       | 3.09    |
|     |           |          |     |           | $CeO_2$ |
| 75  | 21.5      | 1.5      | .9  | 1.5       | 3.54    |
|     |           |          |     |           | $ZrO_2$ |
| 75  | 21.5      | 1.5      | .9  | 1.5       | 2.51    |

As indicated above, the preferred composition is one having the high heat conductivity of BeO and its resistance to corrosion not materially lessened by additions while having sufficient alkaline earth to improve the hot dielectric value; but it will be understood that for some purposes insulators may be entirely satisfactory without having all of the enumerated qualities in the highest possible degree, and therefore useful insulators may be made within the scope of the broader claims while the narrower claims set forth the limitations necessary for best results in certain particulars, as pointed out in the foregoing specification.

The oxides of group IV may be more specifically defined as the "ceramic" oxides of group IV, since the oxides of carbon are not included. Those elements, in addition to carbon, which constitute group IV, are silicon, titanium, germanium, zirconium, tin, hafnium, lead, cerium and thorium, and it is the oxides of these elements which are included in the term "ceramic oxides of group IV."

What I claim is:

1. An electrical insulator showing by chemical analysis from about 50% to about 80% of BeO, from about ½% to about 20% of an alkaline earth oxide of the group consisting of CaO, SrO and BaO, from a trace to not more than about 25% of aluminum oxide and a remainder consisting essentially of at least a trace but not more than 20% of at least one refractory oxide of a metal selected from the group consisting of zirconium, tin, cerium, thorium, boron and yttrium, but not over 10% of an oxide of either of the two last-named metals.

2. An electrical insulator in accordance with claim 1 in which the alkaline earth oxide is CaO.

3. An electrical insulator in accordance with claim 1 in which the alkaline earth oxide is BaO.

4. An electrical insulator in accordance with claim 1 in which the alkaline earth oxide is SrO.

5. An electrical insulator in accordance with claim 1 in which the refractory oxide is ceria.

6. An electrical insulator in accordance with claim 1 in which the refractory oxide is an oxide of tin.

HARRY G. SCHURECHT.

REFERENCES CITED

The following references are of record in the file of this patent:

UNITED STATES PATENTS

| Number | Name | Date |
| --- | --- | --- |
| 2,098,812 | Pulfrich | Nov. 9, 1937 |